United States Patent [19]

Strom

[11] 3,969,718

[45] July 13, 1976

[54] PLASMA PANEL PRE-WRITE CONDITIONING APPARATUS

[75] Inventor: Richard A. Strom, Eagan, Minn.

[73] Assignee: Control Data Corporation, Minneapolis, Minn.

[22] Filed: Dec. 18, 1974

[21] Appl. No.: 534,037

[52] U.S. Cl. .................... 340/324 M; 315/169 TV; 340/343

[51] Int. Cl.[2] .......................................... G06F 3/14

[58] Field of Search ...................... 340/324 M, 343; 315/169 TV

[56] References Cited

UNITED STATES PATENTS

| | | | |
|---|---|---|---|
| 3,803,449 | 4/1974 | Schmersal | 315/169 TV |
| 3,840,779 | 8/1974 | Schermerhorn | 315/169 TV |
| 3,851,210 | 11/1974 | Schermerhorn | 315/169 TV |
| 3,851,327 | 11/1974 | Ngo | 315/169 TV |

*Primary Examiner*—Marshall M. Curtis
*Attorney, Agent, or Firm*—Edward L. Schwarz

[57] ABSTRACT

In a plasma display system, electronic circuitry is used for applying voltage to a plurality of selected cells, all part of a single gas-filled chamber, to cause these cells to be written and erased if previously unwritten, without disturbing the written/not written (lit/unlit) status of every cell in the panel. By thus writing and erasing cells in a particular chamber, writing of data into them is made more reliable because the free electrons necessary to ensure reliable writing are made available for a period of time. The particular technique employed to write and erase these selected cells is particularly well suited for displays using coincident-select writing and erasing. The pulses to perform the operation comprise first, a pulse applied to the electrode adjacent the entire length of a selected chamber. A second pulse is applied to the electrodes transverse to the chambers, causing the unlit cells in the selected chamber to be written. After the first and before the second pulse terminates, a third pulse opposite in polarity is applied to the electrode adjacent the chamber which allows the trailing edge of the second pulse to erase the wall charge created in the previously unwritten cells by the leading edge of the second pulse, but no others.

13 Claims, 3 Drawing Figures

PLASMA PANEL PRE-WRITE CONDITIONING APPARATUS

BACKGROUND OF THE INVENTION

1. Field of the Invention

A typical plasma display system comprises a plurality of elongate tubes formed from glass or other transparent material. The permanently sealed chambers are filled with any of the various gases which provide visible light upon ionization by the passage of an electric current through them. The tubes are arranged in a side by side and parallel fashion to form a flat viewing surface. A plurality of X electrodes are arranged and spaced apart in parallel relationship close to and preferably contacting the tubes along one side and generally orthogonal thereto. On the opposite side of the tubes, one of a plurality of Y electrodes is placed lengthwise along each tube. By applying a voltage of appropriate magnitude (usually 250–400 volts) between a selected X and a selected Y electrode, the gas in the chamber between the two selected electrodes can be made to ionize and conduct, the tube walls between the electrodes and the ionized gas volume acting as a capacitor to permit the current to flow. When the capacitive charge in the cell walls reaches a certain value, the voltage difference across the gas volume becomes insufficient to maintain further conduction, causing conduction and light emission to cease. It is well known that this wall charge will permit subsequent conduction by the cell wall in the opposite direction by the application of an appreciably lower opposite polarity voltage between these two electrodes. By applying between the plurality of X electrodes and the plurality of Y electrodes an alternating sustaining voltage, those gas volumes or cells which have been previously written (as defined by the presence of wall charge) can be maintained in that condition, and those not written or written and subsequently erased can be maintained in the unlit condition.

It is well known that for writing of individual cells to occur reliably and at a reasonably low voltage, at least one electron must be present in the gas volume to be written, since this allows a small amount of current to quickly avalanche into maximum ionization and current flow. It has further been discovered that the presence of such free electrons can be assured for a period of time by earlier writing of the chosen cell or another cell adjacent it in the same gas chamber. Even though wall charge is subsequently removed from the cell, free electrons will be available for a relatively long period of time, and permit subsequent writing at a relatively low voltage. One modification to create a supply of such free electrons involves the use of concealed pilot cells at the ends of the tubes constantly maintained in a lit condition. The use of such pilot cells is satisfactory for shorter chambers, on the order of a few inches long. However, for panels employing relatively long gas chambers in the 15–40 inch range, the pilot cells at the ends of the chambers cannot effectively create free electrons in the central parts of the chambers, with the result that writing of these centrally located cells cannot occur reliably.

2. Description of the Prior Art

One solution to this problem is described in U.S. Pat. No. 3,786,474 (Miller). As it is understood, Miller involves first placing a so-called condition pulse on the Y electrode associated with a gas chamber causing all unlit cells to light. Then a so-called X electrode neutralizing pulse is applied to all the cells along the tube except for those to be written, which causes all those lit by the conditioning pulse to be erased, without erasing those previously written. An addressing pulse is applied on the X electrode of the cell to be written with the result that this cell achieves written or lit status, because it is given the normal wall charge characteristic of such a state.

Another technique to solve this problem is to employ two different lit or conductive states to furnish the binary values required. Each state is represented by a different level or polarity of wall charge chosen so that a cell in one state can be switched to the other without disturbing other cells, so that all wall charge states can be sustained without affecting status of either. In such a situation, since all cells or gas volumes are undergoing periodic firing, no problem exists since free electrons are continuously created in the gas. See *Data Manipulation and Sensing-Plasma Display*, Robert L. Johnson, et al., December, 1971, dist. by NTIS, No. AD-737371, particularly Ch. II; *Coordinated Science Laboratory Report* for September, 1968, pub. Univ. of Ill. No. AD-692,196; and *Coordinated Science Laboratory Report* for July, 1969–June, 1970, Univ. of Ill., AD-711,278. *Materials of High Vacuum Technology*, Warner Espe, pub. Pergamon Press 1968 is a scholarly and authoritative work in the field.

BRIEF DESCRIPTION OF THE INVENTION

As previously explained, the capacitive wall charge performs a data-storage function in a plasma display panel by creating a wall voltage which aids or opposes further conduction by the adjacent gas volume depending on the polarity of the applied voltage. In this invention, a combination of pulses fire all unlit cells along a single tube in a manner which creates a wall charge and voltage greater than that associated with a cell in a normal written or lit condition. This greater wall charge allows a subsequent erase pulse combination to erase only those cells having the greater-than-normal wall charge and does not affect the wall charge adjacent normally lit cells. This special second wall charge condition is referred to as the dual-on-state (DOS) condition, and pulses creating it as DOS pulses. After having been thus written and erased, some electrons in these gas volumes will achieve excited states which allow reliable writing at a relatively low voltage level. These excited states persist for many milliseconds after being created, ample time to permit conventional writing of desired cells to create the wall charge associated with lit cells.

During normal operation sustain pulses are alternately applied between the plurality of first and the plurality of second electrodes. It is important that the polarity of the DOS pulses be correctly oriented with respect to the wall charge polarity in the lit cells. This means that the sustain pulse train must be interrupted for the DOS pulse train immediately following a sustaining pulse which produces the correct wall charge in the lit cells.

The DOS pulse sequence starts with a first biasing pulse between all the X electrodes and the Y electrode adjacent the cells in which it is desired that writing occurs (hereafter the Y select line). The first biasing pulse polarity must be that of the last sustain pulse. However, its voltage is less than the minimum necessary to cause any of the cells to be written. After this pulse has reached its maximum amplitude and before it has been removed, a firing pulse is placed between the plurality of X electrodes and the selected Y electrode, of polarity to add to the effect of the first biasing pulse on the cells along the selected Y electrode. The magnitude of the firing pulse should be great enough to cause the firing of all unlit cells but not so great as to cause the firing of any cells which are lit. Conveniently, the firing pulse can comprise an ordinary sustaining pulse. After the firing pulse has attained its maximum value, the first biasing pulse on the selected Y electrode is reversed in polarity and forms a second biasing pulse having a level which causes the trailing edge of the firing pulse to erase the newly lit cells, but which does not affect the wall charge of previously lit cells. Thereafter, the biasing pulse on the selected Y electrode is ended and normal sustain operation can again begin. For many miliseconds thereafter, however, reliable writing can occur anywhere along the selected Y electrode with ample numbers of free electrons present.

The advantage of this apparatus for supplying free electrons is that it can be easily integrated into already existing systems which utilize a coincident write and erase technique. In addition, where sustaining is performed by alternate application of pulses to the two sets of electrodes; much of the sustain circuitry can be used to supply the DOS pulses, achieving further economies.

DESCRIPTION OF THE PREFERRED EMBODIMENT

Figure 1:
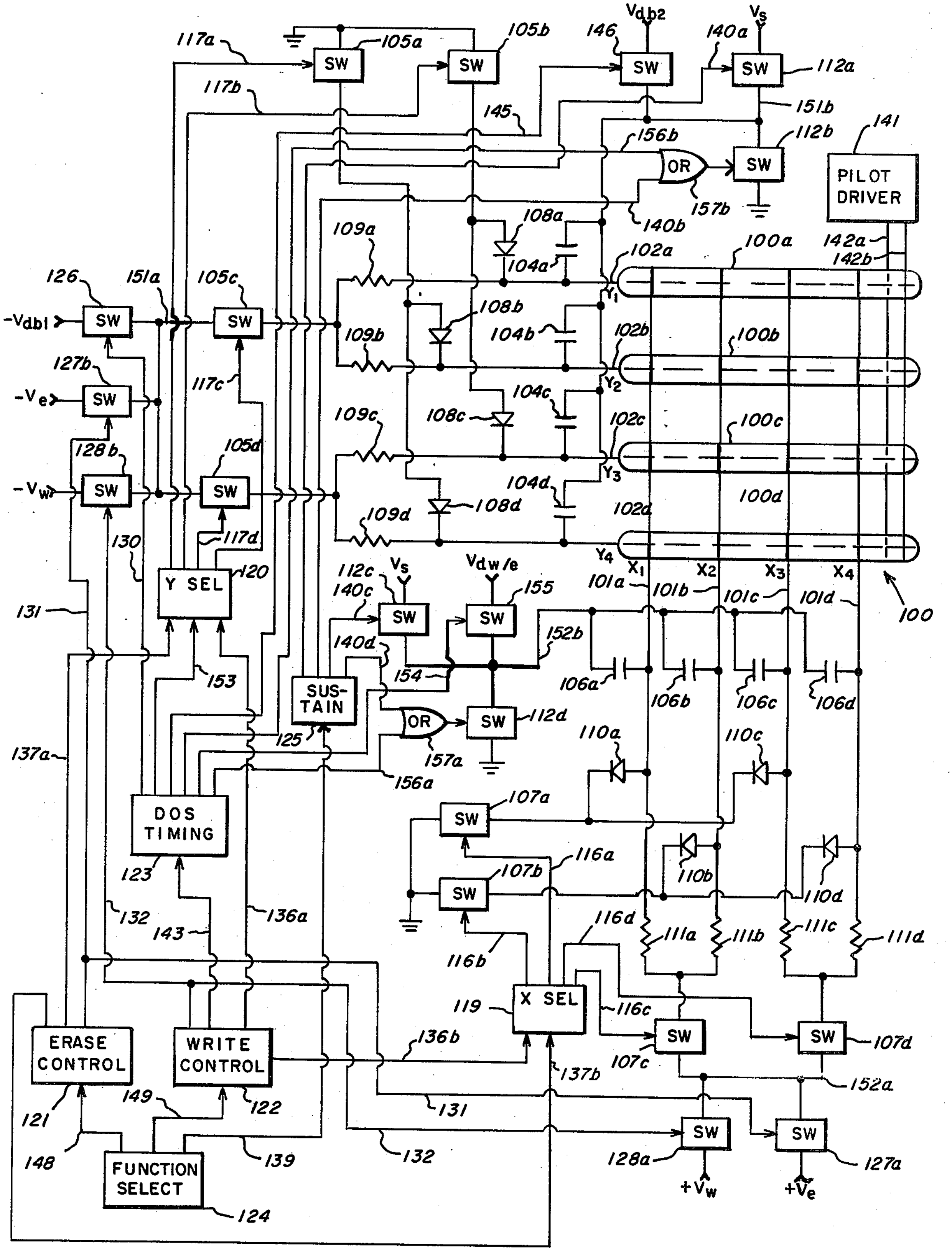
FIG. 1 is a detailed block diagram of a plasma display system employing a preferred embodiment of the invention.

The display system diagrammed in FIG. 1 has been simplified in that the display panel is shown as a matrix of many fewer cells than that which normally would be employed in a system for commercial use. However, the principles displayed are applicable to a panel having any number of ionizable cells or gas volumes. The panel comprises tubes 100*a*–100*d* each of which has within itself a sealed chamber extending substantially its entire length. The chambers are filled with any of the various well-known gas mixtures which can be locally ionized by the application of a voltage gradient across any desired volume thereof, and thereby made to produce visible light. X electrodes 101*a*–101*d* are placed adjacent tubes 100*a*–100*d* on their near or front side as viewed in FIG. 1. Each Y electrode 102*a*–102*d* is placed adjacent and approximately parallel to one of tubes 100*a*–100*d* on its back or far side with respect to the viewer of FIG. 1. Tubes 100*a*–100*d*, Y electrodes 102*a*–102*d*, and X electrodes 100*a*–100*d* are all shown parallel to others of the same designation, although this is not necessary. Y electrodes 102*a*–102*d* are shown generally orthogonal to X electrodes 101*a*– 101*d*, although this also need not be so. It is important each Y electrode 102*a*–102*d* extends along a single one of tubes 100*a*–100*d*. Both X electrodes 101*a*–101*d* and Y electrodes 102*a*–102*d* are shown as wires, but it may be convenient to form them of conductive transparent films placed on the exterior of tubes 100*a*–100*d*, or in any of the various embodiments of the prior art. It should be understood that each X and Y electrode 101*a*–101*d* and 102*a*–102*d* is in close and intimate contact with the tubes themselves so as to create relatively high capacitance between them and the gas adjacent, with the tube wall only functioning as the dielectric.

It is further assumed that application of a suitable voltage potential between a selected Y electrode 102*a*–102*d* and a selected X electrode 101*a*–101*d* will cause the gas commonly adjacent both selected electrodes to ionize and conduct current briefly and in so doing emit light. Such current flow and light emission ceases when the inherent capacitance between the selected X electrode and selected Y electrode adjacent the cell becomes charged to a level sufficiently close to the difference between the voltages applied to the selected X and Y electrode involved that voltage across the gas volume falls below $V_{mc}$, the minimum voltage to sustain conduction. $V_{mc}$ is typically in the range of 100–200v. To cause further conduction, the voltages on the X electrode and the Y electrode may be reversed before the wall charge is discharged by leakage, allowing conduction in the opposite direction with a lower voltage than if no residual wall charge is present. This is because the voltage caused by the wall charge in the inherent wall capacitance has polarity which tends to assist the firing of the cells by the voltage between the adjacent electrodes of polarity opposite that of the most recent pulse. Therefore, each cell between any X electrode 101*a*–101*d* and any Y electrode 102*a*–102 *d* can be considered to be a single memory bit whose content is indicated by the decreased voltage difference needed between the X electrode and Y electrode adjacent that cell to cause light emission when wall charge caused by a recent cell firing is present. By the application of the sustaining pulses of a preselected polarity to all Y electrodes 102*a*–102*d*, alternately with similar pulses of the same polarity to X electrodes 101*a*–101*d*, the conductive/non-conductive status of all cells may be maintained indefinitely. This memory characteristic as well as means for writing individual cells are explained in greater detail in U.S. Pat. Nos. 3,573,542 (Mayer, et al.) and 3,671,938 (Ngo).

Figure 2A:
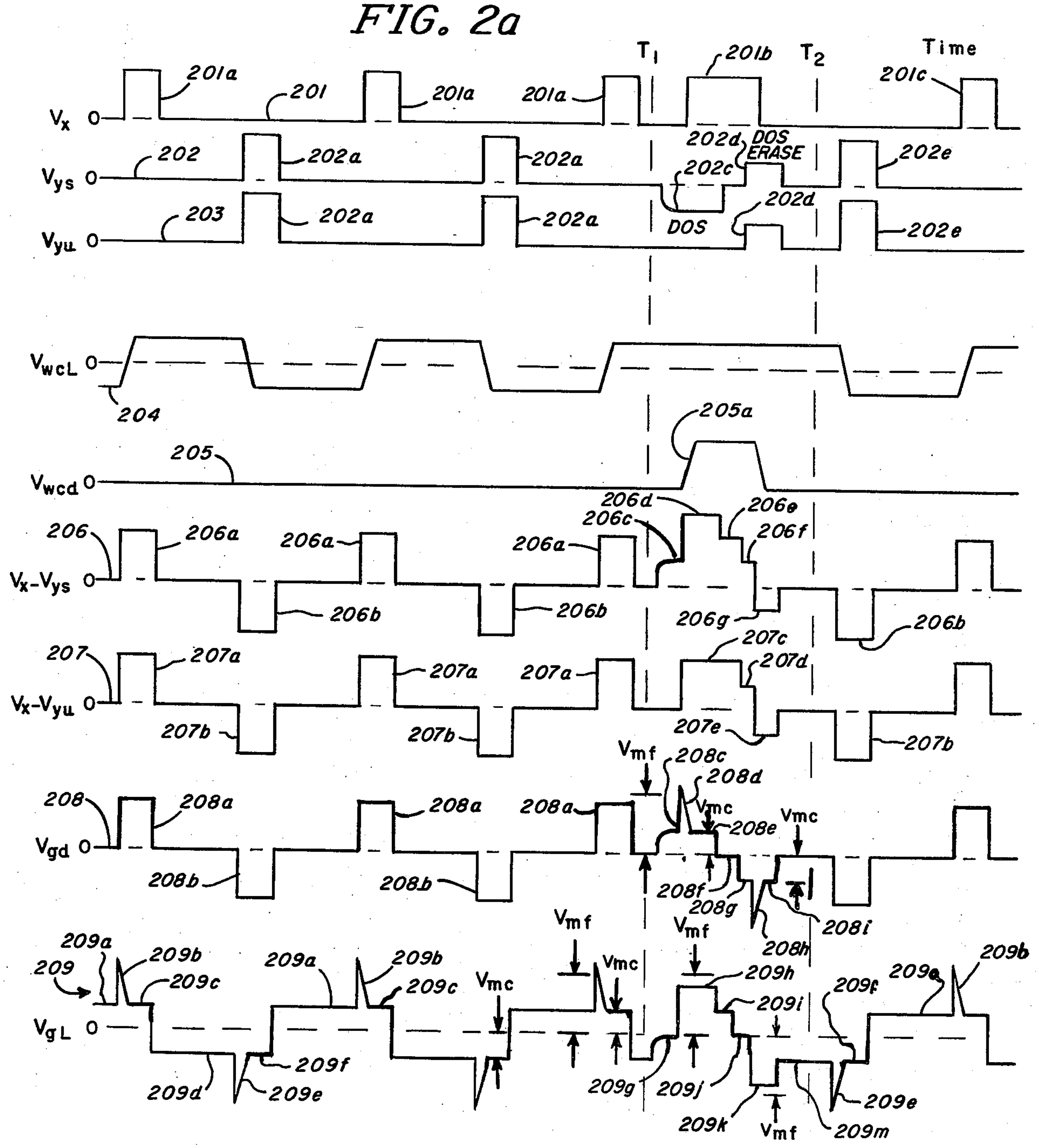
FIG. 2*a* is a set of voltage waveforms associated with the plasma display elements of FIG. 1.

Sustain operation is controlled in FIG. 1 by sustain control apparatus 125, which supplies individual control pulses on paths 140*a*–140*d* to close switches 112*b* and 112*c*, and 112*a* and 112*d* alternately. Switches 112*b* and 112*d*, which are also used in the DOS sequence receive control signals through OR gates 157*a* and 157*b*. Closing of these switches applies the sustain voltages to busses 151*b* and 152*b* and then, through capacitors 104*a*–104*d* and 106*a*–106*d*, to the X and Y electrodes. These and other switches in FIG. 1 are represented by blocks labeled SW, and may conveniently be of the type whose impedence between the current paths on opposite sides of the blocks is essentially zero whenever a suitable positive voltage is applied to the control path having an arrowhead thereon and entering the block on the side between the two current paths. Referring to FIG. 2*a*, pulses 201*a* and 202*a* are typical sustain pulses to be applied respectively to X electrodes 101*a*–101*d* simultaneously and to Y electrodes 102*a*–102*d* simultaneously, with the timing relationship shown between $V_{xs}$ waveform 201 and $V_{ys}$ waveform 202. The time between successive sustain pulses 201*a* and 202*a* need only be short enough to maintain the wall charge of lit cells and long enough to maintain light intensity within the comfortable range. The magnitude of sustain voltage $V_s$ depends on the physical and electrical characteristics of the gas, tube, and electrodes, as is well known in the art. $V_s$ must be large enough to insure that it, combined with the wall charge voltage is sufficient to cause lit cells to fire and unlit cells to remain unlit. $V_s$ may vary within a range without affecting proper sustain activity.

FIG. 1 includes plasma panel apparatus employing the well-known coincident selection write and erase techniques. Selection of an individual X electrode 101a–101d is controlled by X selection control 119; the selection of an individual Y electrode 102a–102d is controlled by Y selection control 120. Function select 124 transmits a control signal on either path 149 or 148 to start either a write or erase operation, respectively, and simultaneously disables sustain control apparatus 125 with a signal on path 139. The signal sent on path 148 or 149 to erase control 121 or write control 122 specifies the desired X electrode and Y electrode which pass adjacent the individual cell in panel 100 to be written or erased.

To take writing as an example, write control 122 supplies a signal on path 136b identifying the specified X electrode to X select control 119 and a similar signal on path 136a to Y select control 120 identifying the selected Y electrode. Write control 122 also supplies a signal on path 132 closing switches 128a and 128b and applying the half write voltages $+V_w$ and $-V_w$ to busses 152a and 151a respectively. Half write voltage $+V_w$ is applied to the single X electrode specified to X select control 119 on path 136b by applying control signals to paths 116a–116d causing one of switches 107a and 107b to close and the other to remain open, and one of switches 107c and 107d to remain open and the other be closed. Closing one of switches 107a and 107b causes either $X_1$ and $X_3$ electrodes 101a and 101c to be grounded through diodes 110a and 110c, or $X_2$ and $X_4$ electrodes 101b and 101d to be grounded through diodes 110b and 110d. Closing one of switches 107c and 107d causes either $X_1$ and $X_2$ electrodes 101a and 101b to be connected to half write voltage $+V_w$ through resistors 111a and 111b and bus 152a, or $X_3$ and $X_4$ electrodes 101c and 101d to be connected to $V_w$ through resistors 111c and 111d and bus 152a. An individual Y electrode is similarly selected, to complete the writing of the selected cell. Erasing is similar except that the erase voltages $+V_e$ and $-V_e$ are smaller than $+V_w$ and $-V_w$. Since the purpose of the erase operation is to remove substantially all of the wall charge present adjacent the selected cell, the erase pulses must occur after a sustain pulse which produced voltage across the cell whose polarity was opposite that of the combined erase pulses.

To increase reliability when writing, DOS timing control 123 and its associated elements have been added to this basic system. Prior to the issuance of the signals on paths 132, 136a and 136b which control the write sequence, a write select signal specifying the selected Y electrode is issued on path 143 by write control system 122. DOS timing system 123 receives this signal, causing it to initiate the DOS sequence. Three separate pulses are involved. Thus, DOS timing system 123 produces signals defining six distinct, related time instants, which manipulate switches to form the leading and trailing edges of the three pulses. To understand the operation of the DOS sequence, constant reference will be made to the voltage waveforms of FIG. 2a, which graphically disclose the time relationships and affected cells and electrodes. To make these waveforms more understandable, each of the voltages in FIG. 2a is tabularly defined below.

Figure 2B:
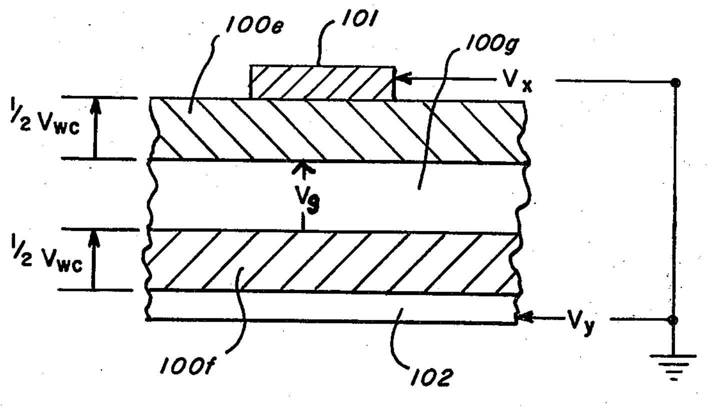
FIG. 2*b* is a cross sectional view of a plasma cell of FIG. 1 annotated to relate physical locations to the voltages displayed in FIG. 2*a*.

FIGS. 2a and 2b Voltage and Waveform Definitions

Vx — Voltage on all X electrodes with respect to ground
Vy — Voltage on any Y electrode with respect to ground
Vys — Voltage on the selected Y electrode(s) with respect to ground
Vyu — Voltage on the unselected Y electrodes with respect to ground
½Vwc — Voltage across one gas chamber wall adjacent any cell; 2(½ Vwc) = Vwc
Vwc — Total voltage across both gas chamber walls adjacent each lit cell
Vwcd — Total voltage across both gas chamber walls adjacent each unlit (dark) cell
Vx-Vys — Voltage on an X electrode with respect to a selected Y electrode
Vx-Vyu — Voltage on an X electrode with respect to an unselected Y electrode
Vg — Voltage between the internal chamber walls (across the gas) adjacent any cell
Vgd — Voltage between the internal chamber walls (across the gas) adjacent each unlit cell
Vgl — Voltage between the internal chamber walls (across the gas) adjacent each unlit cell
Vmf — Minimum firing voltage, i.e., that necessary to initially cause the gas to conduct when free electrons are present therein
Vmc — Minimum conduction voltage, i.e., the minimum necessary to sustain conduction once the gas in the cell has fired.

The DOS sequence begins with first biasing pulse 202c, (FIG. 2a), which is applied preferably to only the selected Y electrode. Its identity, signaled on path 143, is supplied by DOS timing system 123 on path 153 to Y select control 120, which in turn applies signals on paths 117a–117d leaving only the selected Y electrode ungrounded and connected to bus 151a. DOS timing system 123 simultaneously supplies a signal on path 130 closing switch 126 and connecting voltage $-V_{db1}$ to bus 151a. To prevent X electrodes 101a–101d and any unselected Y electrodes from being affected by the application of this pulse, DOS timing system 123 also applies signals to paths 156a and 156b closing switches 112b and 112d. The completion of the connection of voltage $-V_{db1}$ to the selected Y electrode corresponds to the leading edge of pulse 202c. The one of capacitors 104a–104d connecting the selected Y electrode to bus 151b is charged to near voltage $-V_{db1}$ resulting in the approximately exponential curve shape assumed by the leading edge of first biasing pulse 202c. As soon as the level of pulse 202c nears $-V_{db1}$ firing pulse 201b is applied by DOS timing system 123 by supplying a pulse on path 154 closing switch 155 and applying voltage $V_{dw/e}$ to bus 152b, and simultaneously removing the closure signal on path 156a, opening switch 112d. This causes all cells adjacent the selected Y electrode which are not lit, to fire. After all cells have had opportunity to fire, pulse 202c is ended by DOS timing system 123 removing the selection signal on path 153 and opening switch 126 by removing the signal from path 130. At or shortly after the trailing edge of first biasing pulse 202c, the leading edge of second biasing pulse 202d is created by DOS timing system 123 applying a closure signal on path 145 to switch 146, which applies voltage $V_{db2}$ to bus 151b. At the same time switch 112b is opened by the removal of the closure signal on path 156b. Shortly after the leading edge of pulse 202d, DOS timing system 123 drops the closure signal on path 154 opening switch 155 and applies a signal on path 156a causing OR gate 157a to again close switch 112d. This causes all cells fired during the leading edge of pulse 201b to fire again in the opposite direction, removing the wall charge temporarily created by their earlier firing. After this second firing is complete, the signal on paths 145 is removed terminating pulse 202d and with it the DOS sequence.

The effect of the voltage pulses generated as described above shown in FIG. 2a is more easily understood when discussed with respect to the geometry of the cell cross section shown in FIG. 2b. In FIG. 2b, cell walls 100e and 100f are shown in cross section with the sealed chamber 100g containing the ionizable gas between them. One of the X electrodes 101a–101d is shown in cross section as electrode 101. One of the Y electrodes 102a–102d is shown in side view as electrode 102. There are four voltages associated with this representative plasma display cell. The voltage on any X electrode 101a–101d is denoted as voltage $V_x$ and is measured with respect to ground, the arrow associated with the $V_x$ designation having the arrowhead adjacent electrode 101 to denote the direction of measurement for positive voltages. Similarly, voltage $V_y$ associated with Y electrodes 102a–102d is measured from ground with a similar arrowhead designation. As previously explained, the wall charge created on cell walls 100e and 100f provides the memory characteristic which enables the sustain voltage to maintain the cells in their lit/unlit condition. Assuming walls 100e and 100f to be of equal width, the wall charge voltage $V_{wc}$ will divide itself approximately equally between the two walls. This is denoted by showing voltage across each cell wall 100e and 100f as $\frac{1}{2}V_{wc}$. The arrow denotes the direction in which a positive voltage gradient exists across each wall. Voltage $V_g$ similarly indicates the direction of a positive voltage gradient across the ionizable gas volume.

Having thus defined the voltages of interest with respect to individual cells in panel 100, it is assumed that in each individual tube 100a–100d a pilot cell existing between electrodes 142a and 142b is continually sustained in the lit condition by pilot cell control 141. All other cells in each tube 100a–100d may be either lit or unlit. It is important that a complete DOS sequence does not permanently alter any of these cells, whether in the lit or unlit condition. The following analysis shows that this is in fact the case. The implementation of the DOS sequence as previously described is not of particular importance in practicing the invention. However, the effect of each pulse as described in the following analysis is important in utilizing this invention.

Referring first to $V_x$ waveform 201 and $V_{ys}$ and $V_{yu}$ waveforms 202 and 203, pulses 201a and 201c, and 202a and 202e are as previously explained, respectively the normal sustain pulses applied to X electrodes 101a–101d and Y electrodes 102a–102d. The subscripts *x* and *y* refer to voltages applied to the X and Y electrodes 101a–101d and 102a–102d respectively. The subscripts u and s refer to unselected and selected electrodes respectively. Since the DOS pulse sequence placed on X electrodes 101a–101d affects all X electrodes identically only a single $V_x$ waveform 201 need be shown. However, $V_{ys}$ waveform 202 does differ from $V_{yu}$ waveform 203, so both are shown. Waveform 204 displays the wall charge voltage $V_{wcL}$ in a lit cell and $V_{wcd}$ waveform 205 displays the wall charge in a dark or unlit cell adjacent the selected Y electrode.

The DOS conditioning operation takes place between times $T_1$ and $T_2$. For the polarity of the DOS pulses shown, it must start after completion of a sustain pulse applied to X electrodes 101a–101d. The beginning of the DOS sequence is marked by the start of first DOS biasing pulse 202c. This pulse must not be so great as to cause any discharge of either lit or unlit cells. Conveniently, it can have half the magnitude of a typical sustain pulse 202a. In the special case where firing pulse 201b has the magnitude of the sustain pulses 201a and 202a, the magnitude of first biasing pulse 202c is preferably equal to $V_{mc}$. It must have polarity opposite that of $V_{ys}$ sustain pulses 202a in order to oppose the effect of the wall charge voltage present in lit cells. After first biasing pulse 202c has attained substantially its maximum excursion, the leading edge of firing pulse 202b occurs. As will be explained later, the magnitude of pulse 201b is superimposed on pulse 202c, and the magnitude of the sum must be sufficient to cause the unlit cells only to fire. The summing point may be floating, if the generator of pulse 201b is merely connected in series with the generator of pulse 202c and this generator circuit then connected between the selected Y electrode and all X electrodes 101a–101d. It is also possible to allow the unselected Y electrodes to float, i.e. be unconnected to ground. However, it is preferred that the voltages all be applied with respect to ground and all unselected electrodes be grounded. The magnitude of pulse 201b must be small enough to leave unaffected all cells along the unselected Y electrodes and the unlit cells along the selected Y electrode. After the leading edge of pulse 201b has caused firing of the unlit cells along the selected Y electrode, pulse 202c is terminated and replaced with a positive second biasing pulse 202d, of substantially the magnitude of pulse 202c. This pulse does not affect any of the cells, lit or unlit. The trailing edge of pulse 201b then causes the cells and only the cells which were lit by the leading edge of pulse 201b to be extinguished by firing them in such a manner that their wall charge is reduced substantially to 0. The trailing edge of pulse 201b must not fall outside the leading and trailing edges of pulse 202d. After pulse 202d has ended the DOS sequence is complete and sustaining can start again with pulse 202e.

The effect of these pulses can be best described by reference to waveforms 204–209. $V_{wcL}$ waveform 204 displays the wall charge voltage created in the lit cells along the selected Y electrode. As can be seen, each positive X sustain pulse 201a causes $V_{wcL}$ to become positive and each positive Y sustain pulse 202a, etc. causes $V_{wcL}$ to become negative. In the unlit (dark) cells, the wall charge voltage shown by $V_{wcd}$ waveform 205 is 0 except during the DOS firing pulse 201b which first creates a positive wall charge and then removes it.

To understand the remaining waveforms 206–209 it is useful to consider for a moment FIG. 2b again. As stated previously, the purpose of the DOS sequence is to cause dark or unlit cells adjacent the selected Y electrode to fire and then remove wall charge created thereby without affecting lit cells anywhere in the panel. The factor which determines whether or not the gas will ionize and conduct between any X electrode and an adjacent Y electrode is whether $V_g$ attains a minimum firing voltage $V_{mf}$. For a typical gas and spacing between walls 100e and 100f, $V_{mf}$ ranges from 200–300 volts. If $V_x$, $V_{wc}$ and $V_y$ are known, $V_g$ can be calculated by simple application of Kirchoff's law of voltage drops, since these voltages will superimpose themselves on each other where overlapped, according to $$V_g = V_x - V_{wc} - V_y \qquad \text{(Formula I)}$$

This equation is true at all times regardless of the ionization state of the gas or of the magnitude of $V_{wc}$, $V_x$ or $V_y$. When the gas in chamber 100g fires, conduction will continue until $V_g$ drops below the minimum value $V_{mc}$, previously mentioned as typically 100–200 volts, whereupon conduction ceases. Whenever the gas in chamber 100g is not conducting, walls 100e and 100f and chamber 100g act as capacitors in series, voltage differential between X and Y electrode 101 and 102 distributing itself across the three elements in inverse proportion to the capacitance contributed by each of the three layers. Since the dielectric constant of walls 100e and 100f is relatively great compared to that of the gas in chamber 100g, this means that the majority of the voltage difference between $V_x$ and $V_y$ will appear across chamber 100g as $V_g$. In theory $V_g$ is between 80 and 90 percent that of $V_x - V_y$. To simplify the analysis, assume all of $V_x - V_y$ appears across chamber 100g when the cell is not firing.

Now applying this analysis to waveforms 206–209, $V_x - V_{ys}$ waveform 206 is formed by simply subtracting the ordinates of $V_{ys}$ waveform 202 from that of $V_x$ waveform 201. The voltage transition from level 206c to level 206d is sufficient to cause $V_g$ to exceed $V_{mf}$, if no wall charge is present, causing the cell to fire and the wall charge shown at level 205a to occur. The removal of first biasing pulse 202c and the application of pulse 202d places the value of $V_x - V_{ys}$ waveform 206 successively at levels 206e and 206f. The trailing edge of pulse 201b then drops $V_x - V_{ys}$ waveform 206 to level 206g which, because of the presence of the wall charge denoted by level 205a causes the cell to fire again in the opposite direction. The pulse 202d ceases, voltage waveform $V_x - V_{ys}$ returns to 0, and the DOS sequence is complete. A similar analysis can be performed for the unselected Y electrodes and is shown as $V_x - V_{yu}$ waveform 207. Since level 207c is identical to and corresponds to the level of pulse 201b, and is the same polarity as the latest of the sustaining pulses, cells adjacent unselected Y electrodes are unaffected by the DOS sequence.

$V_{gd}$ and $V_{gL}$ waveforms 208 and 209 are respectively the voltage across the gas volume of an unlit (dark) cell adjacent the selected Y electrode, and a lit cell (having substantial wall charge) adjacent the selected Y electrode. They graphically reflect the constraints of Formula I. Turning first to an analysis of $V_{gd}$ waveform 208, pulses 208a and 208b, caused by sustain pulses 201a and 202a do not exceed $V_{mf}$ and hence no firing of the individual cells occur during sustain operation. After time $T_1$ the combination of first biasing pulse 202c, represented as level 208c in waveform 208, combined with firing pulse 201b produces the triangular shaped discharge pulse 208d, because the combination of pulses 202c and 201b produce a voltage at the peak of pulse 208d which exceeds $V_{mf}$. The cell discharges and wall charge increases until level 208e, equal to $V_{mc}$, is reached, which is the voltage at which conduction is extinguished. It should be understood that the discharge ramps displayed in association with pulses 208d, 208h, 209b, etc. are intended to be only approximate since the actual voltage path taken by $V_g$ during a gas discharge is not easily analyzed or measured. The difference between the peak of pulse 208d and level 208e is approximately equal to the magnitude of wall charge level 205a created by firing pulse 201b. $V_{gd}$ waveform 208 is made successively more negative by the occurrence of the trailing edge of pulse 202c and the leading edge of pulse 202d as is shown by levels 208f and 208g. After level 208g has been attained, the trailing edge of pulse 201b causes the previously dark cells to be fired again by causing $V_{gd}$ to exceed $V_{mf}$ in the negative direction. This discharge is shown generally by pulse 208h, occurring until $V_{gd}$ reaches the negative voltage whose absolute value is equal to $V_{mc}$ and is shown by level 208i. The trailing edge of pulse 202d then ideally reduces $V_g$ to 0 volts implying that wall charge has been completely removed from the previously dark cells, and that therefore, none of them will conduct during subsequent sustain pulses. It can be easily seen that the ideal maximum level for pulse 202d is identically equal to $V_{mc}$, because this will place $V_{wcd}$ for the dark cells adjacent the selected Y electrode at zero.

It is equally important that the wall charge adjacent the lit cells on the selected Y electrode is not affected by the DOS sequence. $V_{gL}$ waveform 209 can be analyzed to determine that no discharges occur in lit cells adjacent the selected Y electrode during the DOS sequence. The changes which $V_{gL}$ undergoes during normal sustain operation are shown by levels 209a–209f. As can be easily seen, the sum of wall charge voltage as shown by level 209a exceeds $V_{mf}$. Each triangular shaped waveform 209b and 209e correspond to a sustaining discharge and levels 209c and 209f are in absolute value equal to $V_{mc}$. Level 209g represents $V_{gL}$ calculated according to Formula I with $V_x = 0$ and $V_y$ equal to the voltage of pulse 202c. Because of the presence of wall charge, level 209g is near 0, whereas level 208c is significantly different from 0. Thus, when the leading edge of firing pulse 201b occurs, $V_{gL}$ during level 209h does not exceed $V_{mf}$ and hence does not cause firing. $V_{gL}$ is then successively made less positive by the termination of first biasing pulse 202c, the starting of pulse 202 d and the termination of pulse 201b, respectively producing levels 209i, 209j, and 209k without causing $V_{gL}$ to exceed $V_{mf}$. The trailing edge of pulse 202d shifts $V_{gL}$ to level 209m. At this point, normal sustain operation again begins with pulse 209e. It can be seen that at no time during the DOS sequence does $V_{gL}$ exceed $V_{mf}$. Therefore, except for normal leakage, the wall charge conditions will not be altered adjacent lit cells.

Analysis of the waveforms of FIG. 2a show that it is much to be preferred that $V_{mf}$ be much larger than $V_{mc}$ because this condition will create the largest possible wall charge $V_{wc}$. Natural variations in $V_{mf}$ and $V_{mc}$ occur from cell to cell because of the tolerance in many of the physical parameters. By making the difference between $V_{mf}$ and $V_{mc}$ large, greater tolerances may be employed in the generation of the voltages, resulting in greater reliability and lower cost for apparatus empb y-ing these teachings. A simple method to accomplish this condition is to make the distance between the inside faces of walls 100e and 100f relatively large compared to the thickness of walls 100e and 100f. Appropriate selection of the gas charge and pressure also has significant effect on these parameters. See Espe, supra.

It should be understood that the invention is applicable to other types of addressing schemes besides the clamp and driver selection apparatus shown. Similarly, the durations and time relationships of the various pulses in the DOS sequence are intended to be only representative of the wide variations possible.

Since the leading edge of firing pulse 201b can occur as soon as first biasing pulse 202c nears its maximum value, in systems having fast rise times for pulse 202c these two leading edges can be coincident. And in the illustrative system, the leading edge of second biasing pulse 202d can coincide with the trailing edge of firing pulse 201b. Also, the trailing edge of first biasing pulse 202c can coincide with the leading edge of second biasing pulse 202d without affecting operation, whether coincident with the trailing edge of firing pulse 201b or not.

It is also quite obvious that the entire polarity scheme can easily be reversed, resulting in firing and erasing in the opposite directions of polarity, of unlit cells along the selected Y electrode. Another possible variation mentioned earlier is to apply pulse 202d only to the selected Y electrode as it is not necessary to apply it to unselected Y electrodes. Of course, it does no harm if applied to them.

Having thus described the invention and certain variations thereof, what is claimed by Letters Patent is:

1. In a gas discharge display matrix of the type having at least one chamber containing ionizable gas and formed of a dielectric having at least one first electrode extending along a first side of the chamber and spaced apart from any other first electrodes and a plurality of spaced apart second electrodes on a second side of the chamber, said electrodes located so as to interpose an ionizable gas volume and a portion of the dielectric between each first electrode and each second electrode for which i. a write pulse between a first and a second electrode of voltage at least equal to a minimum firing value causes firing of the gas volume between these electrodes and creation of substantial wall charge adjacent thereto, if no adjacent wall charge is present, ii. a sustain pulse between a first and a second electrode of voltage in a range between preselected minimum and maximum sustain values causes firing of the gas volume between these electrodes and creation of a substantial wall charge adjacent thereto if substantial wall charge of polarity discharged by the sustain pulse is present, and insures not firing otherwise, and iii. an erase pulse between a first and a second electrode of voltage between preselected maximum and minimum erase voltages and of polarity discharging wall charge adjacent the gas volumes between these electrodes created by a previous sustain pulse, insures removal of substantially all of said wall charge, and means for applying to the electrodes said write, sustain and erase pulses in the manner indicated; improved apparatus for making free electrons available to selected gas volumes for increasing reliability in firing by a write pulse, and comprising:

a. timing means for receiving a write select signal specifying at least one first electrode and for issuing responsive thereto at least one timing signal occuring prior to the associated write pulses, and following a selected sustain pulse having preselected first polarity; and b. means receiving each timing signal and write select signal for applying between the selected first electrode and the plurality of second electrodes first and second dual-on-state biasing pulses, and a dual-on-state firing pulse all superimposed on each other where overlapped;

i. each of said first biasing pulses starting responsive to the first timing signal and having a predetermined duration, reaching a predetermined magnitude appreciably different from zero and no greater than the maximum sustain voltage and having the same polarity, measured with respect to the electrodes involved, as was created by the selected sustain pulse;

ii. each of said second biasing pulses having polarity opposite that of the first biasing pulse, starting after the first biasing pulse and having a predetermined duration, and a predetermined magnitude substantially different from zero and no greater than the minimum sustain voltage; and iii. each of said firing pulses having polarity opposite that of the first biasing pulse, having magnitude less than the minimum write voltage and sufficient to cause conduction, when superimposed on the first biasing pulse, by each gas volume between the plurality of second electrodes and the selected first electrode which did not conduct during the most recent sustain pulse, but insufficient to cause conduction by the gas volumes adjacent the selected first electrode which did conduct at that time, and starting and finishing during the first and second biasing pulses respectively.

2. The apparatus of claim 1, including means for applying sustain pulses of alternating polarity between the first electrode and the second electrodes and for suspending application of sustain pulses for a time at least equal to the time between the leading edge of the first biasing pulse and the trailing edge of the second biasing pulse responsive to a sustain delay signal, wherein the timing means includes synchronizing means supplying a sustain delay signal to the sustain pulse applying means responsive to the selected sustain pulse and the write select signal.

3. The apparatus of claim 2, wherein the firing pulse is substantially the magnitude of the sustain pulse.

4. The apparatus of claim 2, wherein the sustain pulse applying means further comprises means for grounding electrodes when not receiving pulses, and alternately applying sustain pulses of a preselected polarity between ground and the first electrodes, and between the ground and the second electrodes, and the dual-on-state pulse applying means further comprises means applying between ground and the selected first electrode, the first biasing pulse with polarity opposite that of the sustain pulses, following application of a sustain pulse to the second electrodes.

5. The apparatus of claim 4, wherein the dual-on-state pulse applying means further comprises means for applying the firing pulse between ground and the plurality of second electrodes, said firing pulse having the polarity of the sustain pulses applied to the second electrodes.

6. The apparatus of claim 5, wherein the dual-on-state pulse applying means further comprises means for applying the second biasing pulse between ground and each first electrode, said second biasing pulse having the polarity of the sustain pulses.

7. The apparatus of claim 4, further comprising means for applying each write pulse following at least two consecutive sustain pulses immediately following the second biasing pulse.

8. The apparatus of claim 2, wherein the chamber geometry and gas characteristics are such that conduction by the gas ceases when voltage across the gas has been reduced to a predetermined minimum conduction level, wherein a further improvement comprises means cooperating with the dual-on-state pulse applying means, for causing the level of the second biasing pulse to substantially equal the minimum conduction level.

9. The apparatus of claim 8, wherein the firing pulse is within the allowable range for sustain pulses.

10. The apparatus of claim 9, wherein the improvement further comprises means for causing the level of the first biasing pulse to substantially equal the minimum conduction level.

11. The apparatus of claim 1, wherein the timing means further comprises means causing the leading edges of the second biasing pulses and the leading edges of the firing pulses to coincide.

12. The apparatus of claim 11, wherein the dual-on-state applying means further comprises means causing the trailing edges of the first biasing pulses to substantially coincide with the trailing edges of the firing pulses.

13. The apparatus of claim 1, wherein the leading edges of the firing pulses occur approximately when the first biasing pulses substantially attain their maximum value.

* * * * *